(12) United States Patent
Chung et al.

(10) Patent No.: US 8,752,888 B2
(45) Date of Patent: Jun. 17, 2014

(54) SUNROOF GLASS LIFTING PREVENTION DEVICE AND SUNROOF ASSEMBLY INCLUDING THE SAME

(71) Applicants: Hyundai Motor Company, Seoul (KR); Kia Motors Corporation, Seoul (KR)

(72) Inventors: Ho Gie Chung, Suwon-si (KR); Jeong Sik Cho, Hwaseong-si (KR); Kihwan Kim, Incheon (KR); Sea Cheol Song, Ansan-si (KR); Seung Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/717,487

(22) Filed: Dec. 17, 2012

(65) Prior Publication Data
US 2013/0241245 A1  Sep. 19, 2013

(30) Foreign Application Priority Data

Mar. 15, 2012  (KR) ......................... 10 2012 0026791

(51) Int. Cl.
*B60J 7/00* (2006.01)
(52) U.S. Cl.
USPC ................................ 296/216.06; 296/216.07

(58) Field of Classification Search
USPC ............................................ 296/216.01–224
See application file for complete search history.

(56) References Cited

U.S. PATENT DOCUMENTS

| 3,972,558 | A | * | 8/1976 | Horn .............................. 296/213 |
| 4,386,802 | A | * | 6/1983 | Cunningham et al. ......... 296/213 |
| 4,457,111 | A | * | 7/1984 | Koike .............................. 49/441 |
| 5,095,655 | A | * | 3/1992 | Warren ........................... 49/374 |

FOREIGN PATENT DOCUMENTS

| JP | 04146815 | * | 5/1992 |
| JP | 5-213065 A | | 8/1993 |
| JP | 10-315788 A | | 12/1998 |
| JP | 3704645 B2 | | 8/2005 |
| KR | 10-2005-0097319 A | | 10/2005 |
| KR | 10-2009-0125877 A | | 12/2009 |

* cited by examiner

*Primary Examiner* — Dennis H Pedder
(74) *Attorney, Agent, or Firm* — Morgan, Lewis & Bockius LLP

(57) ABSTRACT

A sunroof glass lifting prevention device may include at least one holder that may be provided to corresponding to a front end portion of a sunroof glass and that supports the front end portion of the sunroof glass.

16 Claims, 8 Drawing Sheets

SUNROOF GLASS LIFTING PREVENTION DEVICE AND SUNROOF ASSEMBLY INCLUDING THE SAME

CROSS-REFERENCE TO RELATED APPLICATION

The present application claims priority to Korean Patent Application No. 10-2012-0026791 filed in the Korean Intellectual Property Office on Mar. 15, 2012, the entire contents of which is incorporated herein for all purposes by this reference.

BACKGROUND OF THE INVENTION

1. Field of the Invention

The present invention relates to a sunroof assembly of a vehicle. More particularly, the present invention relates to a sunroof glass lifting prevention device that can prevent sunroof glass from lifting up when a vehicle travels in a high speed.

2. Description of Related Art

In general, a sunroof is formed with a sunroof assembly that is mounted in a roof of a vehicle body and has a structure that enables sunroof glass to selectively open and close an opening that is formed in the sunroof assembly.

For example, a method in which an opening is formed at the front of a roof and in which sunroof glass opens and closes the opening is generally used. Nowadays, a panorama sunroof that forms most of a roof panel with glass and that opens and closes a portion of the glass obtains popularity of consumers.

The sunroof is classified into a slide type, a tilt-up type, or a slide tilt-up type according to an opening and closing method of sunroof glass.

In the sunroof assembly, for sealing an opening and sunroof glass, a weather strip (in the art, generally referred to as "acoustic seal") is applied.

While the weather strip is mounted in a sunroof frame and is compressed and deformed in a close direction of the sunroof glass, the weather strip prevents a foreign substance such as dust and rainwater and noise from being injected into the vehicle.

However, in a state that the weather strip generally seals sunroof glass, when the vehicle travels in a high speed, sunroof glass may be lifted up or pulled outwards out of the sunroof assembly by a pressure difference between indoor air and outdoor air and wind may flow into between the weather strip and the sunroof glass.

Thereby, because sealing between the sunroof glass and the weather strip becomes weak, indoor air escapes to the outside, and thus noise (aspiration noise) such as sound in which breeze goes may occur, and an external foreign substance may flow into indoors of the vehicle.

Therefore, when the vehicle travels in a high speed, due to occurrence of aspiration noise according to lifting-up of sunroof glass, a market value of the vehicle may be deteriorated and silence traveling may be disturbed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sunroof glass lifting prevention device having advantages of preventing sunroof glass from lifting up by a pressure difference between indoors and outdoors of a vehicle when the vehicle travels in a high speed.

In an aspect of the present invention, a sunroof glass lifting prevention device, may include at least one holder that is provided to corresponding to a front end portion of a sunroof glass and that supports the front end portion of the sunroof glass.

The at least one holder is disposed between a roof panel and the front end portion of the sunroof glass and supports the roof panel corresponding to the front end portion of the sunroof glass, the at least one holder being mounted to the sunroof frame.

The at least one holder is made of one material that is selected from resin, plastic, and rubber materials having ductility.

The at least one holder is formed in a "U" shape.

The at least one holder may include a body that is fixed to the sunroof frame and that supports a portion of a weather strip corresponding to the front end portion of the sunroof glass, and a glass guide that is integrally formed with the body and that covers and supports the front end portion of the sunroof glass at with the weather strip.

The body may include a fixing rib that is extended in a lower part thereof and that is connected to the sunroof frame.

The glass guide may have an upper surface of a streamline shape.

The body may further include a coupling rib that is integrally extended from the body and that is disposed at a predetermined gap with the fixing rib.

A fixing groove that receives and fixes the sunroof frame is formed between the fixing rib and the coupling rib.

A coupling hole that slidably receives a coupling protrusion that is formed in the weather strip is formed in the body.

The coupling hole may include a first hole that receives the coupling protrusion and a second hole that couples the coupling protrusion to the body.

A guide rib that houses the coupling protrusion is formed in the body.

In another aspect of the present invention, a sunroof assembly may include a sunroof frame, a sunroof glass that is slidably mounted to the sunroof frame, a weather strip that is installed in the sunroof frame and that seals a roof panel and an edge of the sunroof glass, and a sunroof glass lifting prevention device including at least one holder that is provided to corresponding to a front end portion of the sunroof glass and that engages the front end portion of the sunroof glass to the roof panel.

The at least one holder may include a body that is fixed to the sunroof frame and that supports a portion of the weather strip corresponding to the front end portion of the sunroof glass, and a glass guide that is integrally formed with the body and that covers and supports the front end portion of the sunroof glass with the weather strip.

The body may include a fixing rib that is extended in a lower part thereof and that is connected to the sunroof frame.

The sunroof glass lifting prevention device may further include a coupling rib that is integrally extended from the body and that is disposed at a predetermined gap from the fixing rib to couple the sunroof frame.

A coupling protrusion is formed in the weather strip, wherein a coupling hole that receives and couples the coupling protrusion is formed in the body.

The coupling hole may include a first hole that receives the coupling protrusion and a second hole that couples the coupling protrusion to the body.

A guide rib that houses the coupling protrusion is formed in the body.

The coupling protrusion is connected to the weather strip through a connection protrusion having a cross section smaller than a cross section of the coupling protrusion, wherein the connection protrusion is coupled to the guide rib, and wherein the coupling protrusion is housed at the guide rib.

According to an exemplary embodiment of the present invention, when a vehicle travels in a high speed, it can be prevented that sunroof glass lifts up by a pressure difference between indoors and outdoors of the vehicle.

Therefore, in an exemplary embodiment of the present invention, when a vehicle travels in a high speed, by preventing a sealing performance of a weather strip from being deteriorated by lifting-up of sunroof glass, aspiration noise can be suppressed from occurring.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
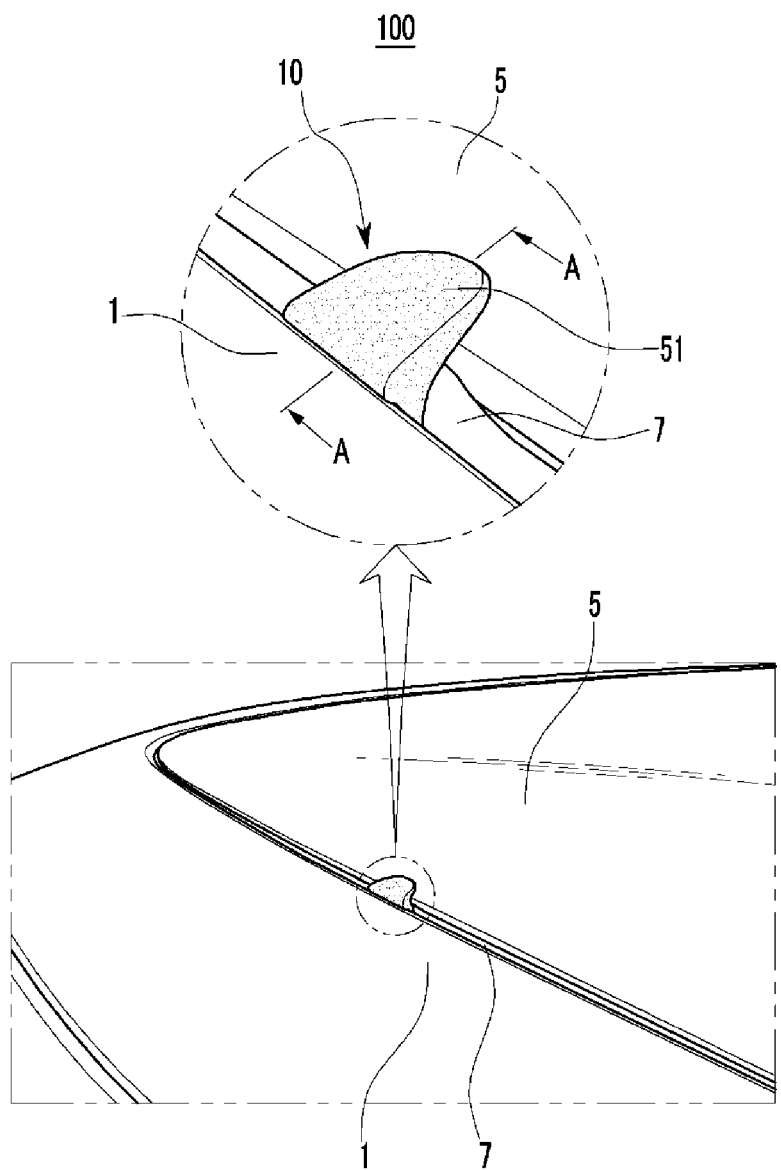
FIG. 1 is a perspective view illustrating a vehicle to which a sunroof glass lifting prevention device is applied according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto and the thickness of layers, films, panels, regions, etc., are exaggerated for clarity.

In the following detailed description, in order to distinguish constituent elements of the same name, the constituent elements have names of a first, a second, and a third, and the first, the second, and the third are not limited to order thereof.

Figure 2:
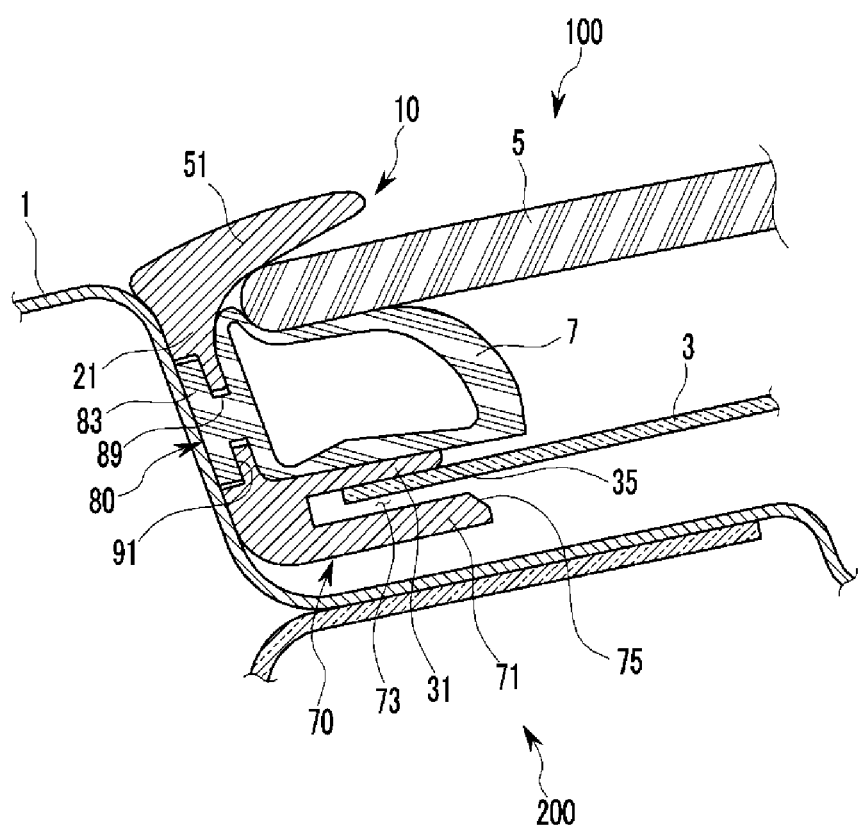
FIG. 2 is a cross-sectional view illustrating the sunroof glass lifting prevention device taken along line A-A of FIG. 1.

FIG. 1 is a perspective view illustrating a vehicle to which a sunroof glass lifting prevention device is applied according to an exemplary embodiment of the present invention, and FIG. 2 is a cross-sectional view illustrating the sunroof glass lifting prevention device taken along line A-A of FIG. 1.

Referring to FIGS. 1 and 2, a sunroof glass lifting prevention device 100 according to an exemplary embodiment of the present invention is applied to a vehicle sunroof assembly 200 that has an opening at a roof of a vehicle and that can selectively open and close the opening through a sunroof glass 5.

For example, the sunroof assembly 200 is classified into a method that forms an opening at the front side of a roof panel and that opens and closes the opening through the sunroof glass 5 and a method that forms most of a roof panel with glass and that opens and closes a portion of the glass (in an exemplary embodiment of the present invention, referred to as a sunroof glass, but in the art, referred to as a "panorama sunroof").

Here, the sunroof assembly 200 opens and closes the sunroof glass 5 with a slide method, a tilt-up method, or a slide tilt-up method using a driving device such as a motor.

The sunroof assembly 200 is applied to a roof panel 1 of a vehicle body, and in the drawing, only the sunroof assembly 200 is illustrated, except for the vehicle body.

The opening is space that is formed by the roof panel 1 and is opened and closed by the sunroof glass 5 of the sunroof assembly 200 for the vehicle.

The sunroof assembly 200 includes a sunroof frame 3 that is mounted in a vehicle body through a bracket, the sunroof glass 5 that is slidably mounted in the sunroof frame 3, and a weather strip 7 that is installed in the sunroof frame 3 and that seals the roof panel 1 and an edge of the sunroof glass 5.

Such a sunroof assembly 200 is formed with various sunroof systems that are well known in the art and therefore a detailed description thereof will be omitted.

In a state in which the weather strip 7 seals between the roof panel 1 and the sunroof glass 5, the sunroof glass lifting prevention device 100 according to an exemplary embodiment of the present invention has a structure that can prevent the sunroof glass 5 from lifting up or being pulled outwards out of the sunroof assembly by a pressure difference between indoors and outdoors of the vehicle when the vehicle travels in a high speed.

That is, when the vehicle travels in a high speed, an exemplary embodiment of the present invention provides a sunroof glass lifting prevention device 100 that can prevent a sealing performance of the weather strip 7 from being deteriorated by lifting-up of the sunroof glass 5 and that can prevent aspiration noise from occurring due to deterioration of a sealing performance.

For this purpose, the sunroof glass lifting prevention device 100 according to an exemplary embodiment of the present invention generally includes a holder 10.

Figure 3:
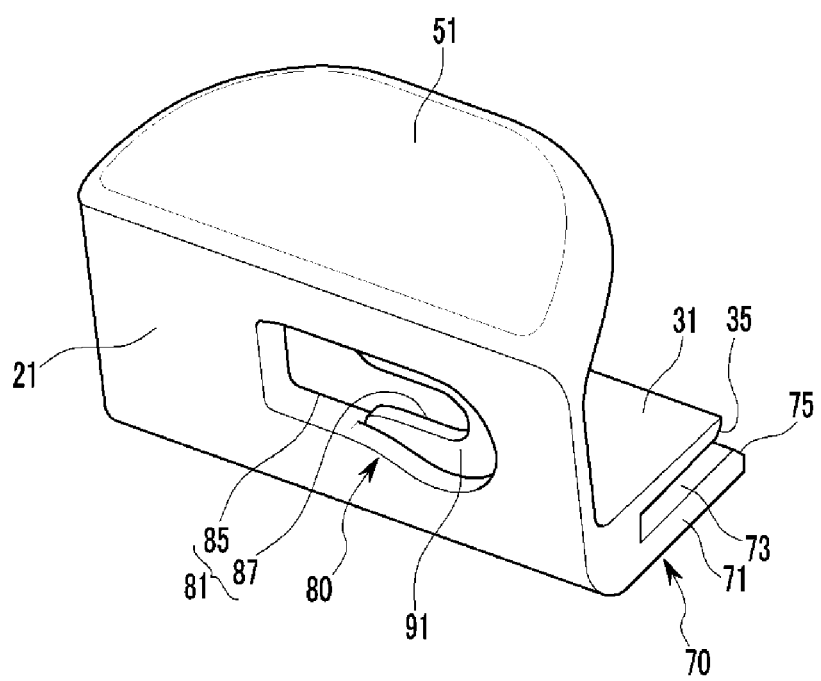
FIG. 3 is a perspective view illustrating a holder that is applied to a sunroof glass lifting prevention device according to an exemplary embodiment of the present invention.
Figure 4:
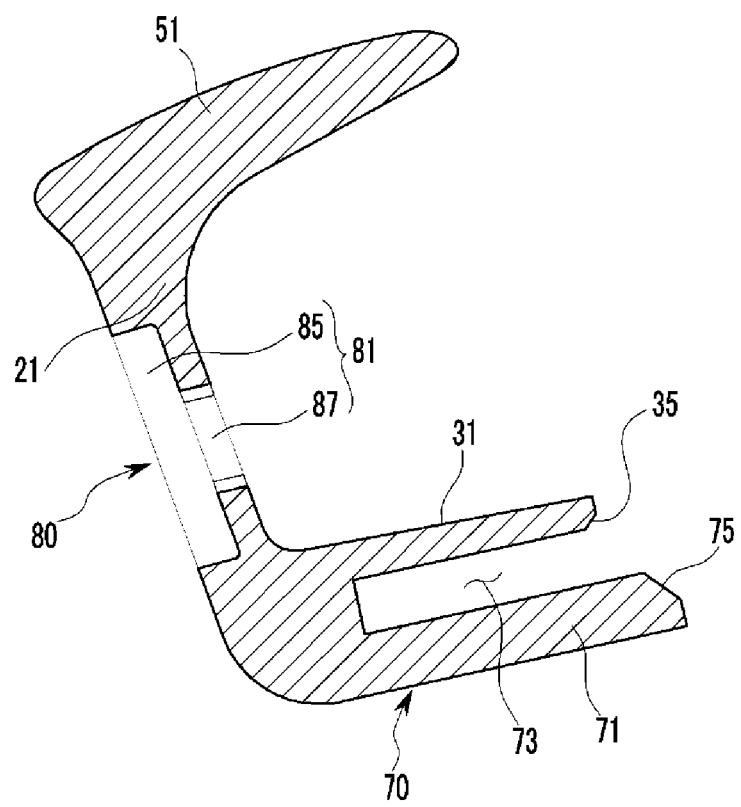
FIG. 4 is a cross-sectional view illustrating a holder that is applied to a sunroof glass lifting prevention device according to an exemplary embodiment of the present invention.
Figure 5:
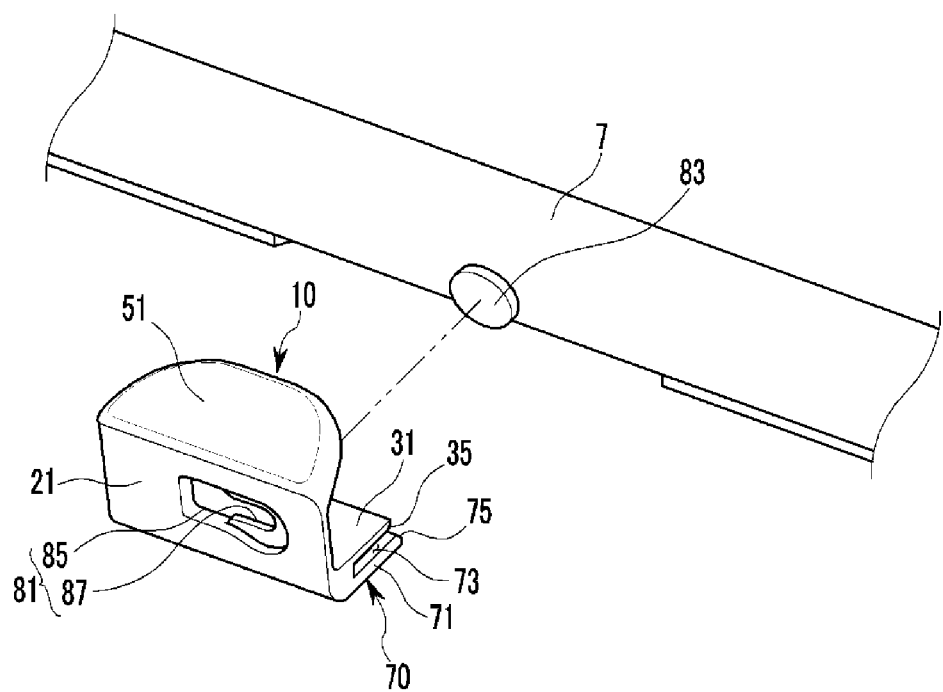
FIG. 5 to FIG. 8 are views illustrating a coupling unit that is applied to a sunroof glass lifting prevention device according to an exemplary embodiment of the present invention.
Figure 6:
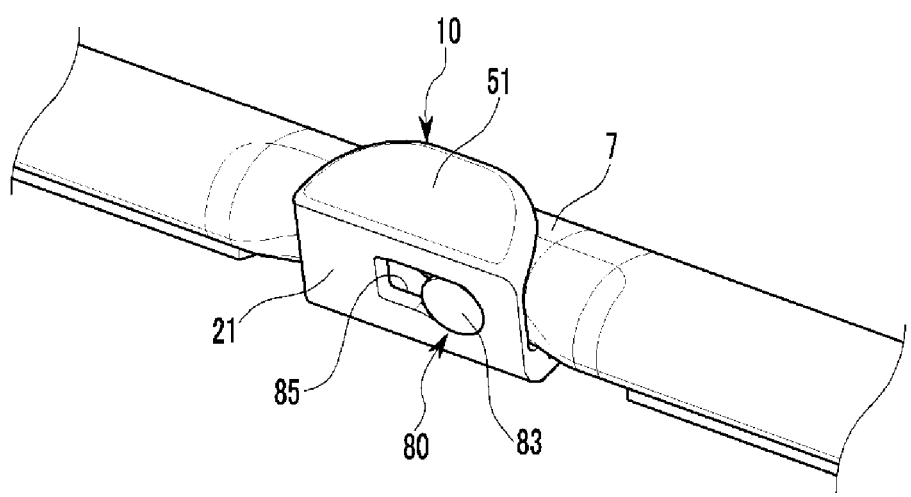
Figure 7:
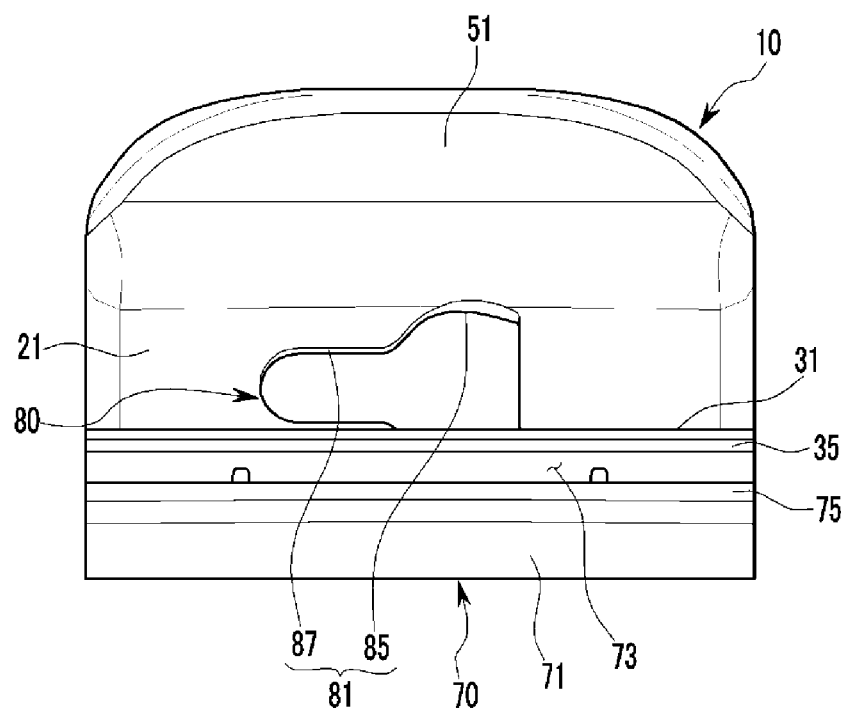
Figure 8:
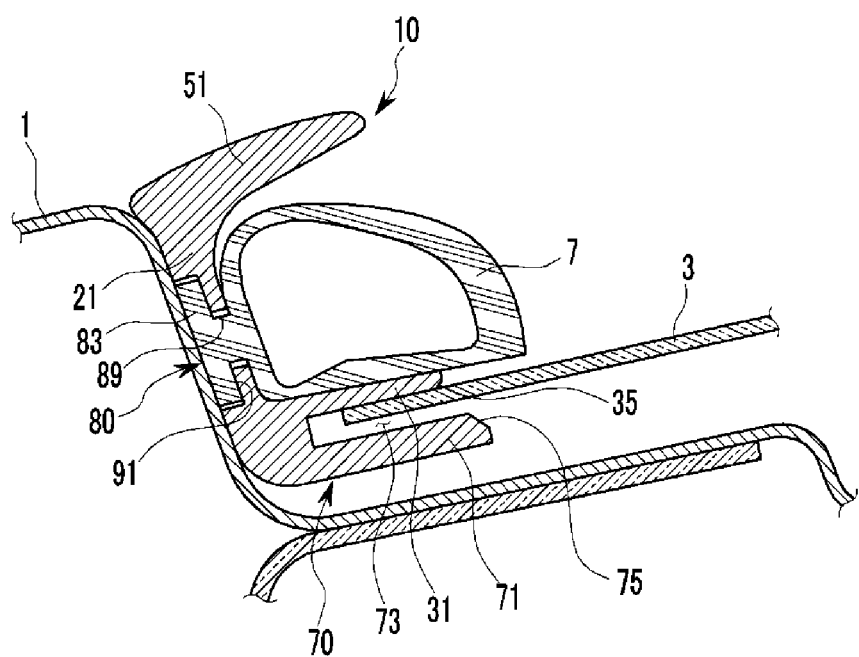

FIG. 3 is a perspective view illustrating a holder that is applied to a sunroof glass lifting prevention device according to an exemplary embodiment of the present invention, and FIG. 4 is a cross-sectional view illustrating the holder of FIG. 3.

Referring to FIGS. 1 to 4, the holder 10 according to an exemplary embodiment of the present invention supports the weather strip 7 between the weather strip 7 and the roof panel 1 and binds a front end portion of the sunroof glass 5 that compresses the weather strip 7.

That is, by binding the sunroof glass 5, the holder 10 prevents the sunroof glass 5 from lifting up by a pressure difference between indoors and outdoors of the vehicle when the vehicle travels in a high speed.

In an exemplary embodiment of the present invention, the holder 10 is provided between the roof panel 1 and the weather strip 7 independent from the weather strip 7 and the sunroof frame 3, and is mounted in the sunroof frame 3 corresponding to a front end portion of the sunroof glass 5.

Here, the holder 10 supports the roof panel 1 corresponding to the front end portion of the sunroof glass 5 and is coupled to the weather strip 7 and the sunroof frame 3.

In an exemplary embodiment of the present invention, the front end portion of the sunroof glass 5 indicates an edge of the sunroof glass 5 toward a front side of the vehicle, and the weather strip 7 seals an edge of the front side of the sunroof glass 5.

That is, the weather strip 7 is disposed in a width direction of a vehicle body corresponding to the front end portion of the sunroof glass 5.

The holder 10 according to an exemplary embodiment of the present invention has a predetermined length and has an approximately "U" shape.

The holder 10 is formed by injection molding a resin, plastic, or rubber material having ductility and may be formed by injection molding a nylon resin.

The holder 10 is disposed with the single number at an intermediate position of an installation path (width direction of a vehicle body) of the weather strip 7.

However, the holder 10 is not limited thereto and may be installed in both end portions of an installation path of the weather strip 7 and may be provided with the plural number according to a size and thickness of the sunroof glass 5.

The holder 10 according to an exemplary embodiment of the present invention includes a body 21 and a glass guide 51.

The body 21 is coupled to the sunroof frame 3 and the weather strip 7 between the roof panel 1 and the weather strip 7 and supports a portion of the weather strip 7 and the roof panel 1.

That is, in the front-rear direction of the vehicle body, a front surface of the body 21 supports the roof panel 1 and a rear surface thereof supports a portion of the weather strip 7.

In an exemplary embodiment of the present invention, the body 21 supports a portion of the weather strip 7, and a lower part thereof is coupled to the sunroof frame 3. For this purpose, a fixing rib 31 that can be coupled to the sunroof frame 3 is formed in a lower portion of the body 21.

The fixing rib 31 is integrally extended toward the rear side of the vehicle body in a lower portion of the body 21 and is attached to the sunroof frame 3 by adhesives or an adhesive tape.

That is, in a state in which the fixing rib 31 is bonded to the sunroof frame 3, a front surface of the body 21 is installed to close contact with the roof panel 1. Here, the front surface of the body 21 may be bonded to the roof panel 1 by adhesives or an adhesive tape.

Further, the fixing rib 31 may support the weather strip 7 through an upper surface thereof.

The sunroof glass lifting prevention device 100 according to an exemplary embodiment of the present invention may further include a first coupling unit 70.

The first coupling unit 70 includes a coupling rib 71 that is integrally extended from the body 21 together with the fixing rib 31 of the body 21 and that is disposed at a predetermined gap downward of the fixing rib 31.

The coupling rib 71 supports the sunroof frame 3, fixes the body 21 to the sunroof frame 3, and is extended toward the rear side of the vehicle body from a lower portion of the body 21 corresponding to the fixing rib 31.

Here, space between the fixing rib 31 and the coupling rib 71 is formed as a fixing groove 73 that can insert and couple the sunroof frame 3.

In this case, at the front and rear of the vehicle body, in order to easily insert the sunroof frame 3 into the fixing groove 73 between the fixing rib 31 and the coupling rib 71, slanted surfaces 35 and 75 that are slanted toward the fixing groove 73 are formed in a rear end portion of the fixing rib 31 and the coupling rib 71, respectively.

Therefore, as the sunroof frame 3 is coupled to the fixing groove 73, the sunroof glass lifting prevention device 100 according to an exemplary embodiment of the present invention is fixed to the sunroof frame 3.

In FIG. 2, the fixing groove 73 is exaggeratedly shown, compared with the sunroof frame 3, but this is for convenience of comprehension, and the sunroof frame 3 may be compressed and coupled between the fixing rib 31 and the coupling rib 71, and the sunroof frame 3 may be coupled between the fixing rib 31 and the coupling rib 71 using adhesives. Further, although it was not shown in the drawings, but the sunroof frame 3 may be coupled between the fixing rib 31 and the coupling rib 71 using a separate fastener.

In an exemplary embodiment of the present invention, the glass guide 51 supports a front end portion of the sunroof glass 5 that compresses the weather strip 7 and is integrally formed with an upper portion of the body 21.

When the sunroof glass 5 is closed, the glass guide 51 guides the sunroof glass 5 and prevents the sunroof glass 5 from lifting up when the vehicle travels in a high speed.

The glass guide 51 is integrally extended toward the rear side of the vehicle body in an upper portion of the body 21.

In this case, in the drawings, an upper surface of the glass guide 51 is formed in a streamline shape having a smooth curved surface, and a lower surface thereof is connected to a rear surface of the body 21 in a round form.

In this way, the reason why an upper surface of the glass guide 51 is formed in a streamline shape is to prevent aerodynamic noise from occurring by decreasing air resistance by the glass guide 51 when the vehicle travels.

As described above, the reason why a lower surface of the glass guide 51 is connected in a round form to a rear surface of the body 21 is to enable the holder 10 to stably support the weather strip 7 and to smoothly guide compression distortion of the weather strip 7 when compressing the weather strip 7 by the sunroof glass 5.

Further, when the sunroof glass 5 is closed, in order to guide the front end portion of the sunroof glass 5, a rear end portion of the glass guide 51 is formed in a round form and is formed in a shape having a gradually reducing thickness.

FIG. 5 to FIG. 8 are views illustrating a coupling unit that is applied to a sunroof glass lifting prevention device according to an exemplary embodiment of the present invention.

Referring to FIGS. 5 to 8 and the foregoing drawings, a sunroof glass lifting prevention device 100 according to an exemplary embodiment of the present invention further includes a second coupling unit 80.

In an exemplary embodiment of the present invention, the second coupling unit 80 couples the holder 10 to the weather strip 7 and includes a coupling hole 81 that is formed in the holder 10 and a coupling protrusion 83 that is formed in the weather strip 7.

The coupling hole 81 is long formed in a length direction of the weather strip 7 in the body 21 of the holder 10.

The coupling hole 81 includes a first hole 85 that inserts the coupling protrusion 83 and a second hole 87 that is connected to the first hole 85 and to which the coupling protrusion 83 is slidably coupled.

The first hole 85 is a hole of a size in which the coupling protrusion 83 can penetrate, and the second hole 87 has a size smaller than the first hole 85 and is a hole of a slit form in a length direction of the weather strip 7.

The coupling protrusion 83 is inserted into the coupling hole 81 of the body 21 and is integrally protruded from the weather strip 7 corresponding to the coupling hole 81.

In an exemplary embodiment of the present invention, the coupling protrusion 83 is integrally connected to the weather strip 7 through a predetermined thickness of a connection protrusion 89 corresponding the body 21.

The connection protrusion 89 integrally connects the coupling protrusion 83 and a strip surface between the coupling protrusion 83 and the strip surface of the weather strip 7 and has a section relatively smaller than the coupling protrusion 83.

Further, the second coupling unit 80 includes a guide rib 91 that inserts the connection protrusion 89 and that is formed to house the coupling protrusion 83.

That is, in a state in which the coupling protrusion 83 is inserted into the first hole 85, in a process of sliding to the second hole 87, the connection protrusion 89 is coupled to the body 21 while being inserted into the guide rib 91 between the coupling protrusion 83 and the strip surface. In this case, the coupling protrusion 83 is housed at one surface of the guide rib 91.

Hereinafter, a method of assembling the sunroof glass lifting prevention device 100 and an operational effect of the sunroof glass lifting prevention device 100 having the above-described configuration according to an exemplary embodiment of the present invention will be described in detail with reference to the above-described drawings.

First, in a state in which the body 21 of the holder 10 is disposed between the roof panel 1 and the weather strip 7, the coupling protrusion 83 of the weather strip 7 is coupled to the coupling hole 81 of the body 21.

In this case, by inserting the coupling protrusion 83 into the first hole 85 of the coupling hole 81, by sliding the coupling protrusion 83 to the second hole 87, and by inserting the connection protrusion 89 into the guide rib 91, the body 21 and the weather strip 7 are fixed.

Thereafter, in an exemplary embodiment of the present invention, the sunroof frame 3 is coupled to the fixing rib 31 of the body 21 or an end portion of the sunroof frame 3 is inserted into and coupled to the fixing groove 73 between the fixing rib 31 and the coupling rib 71.

Here, because the slanted surfaces 35 and 75 that are slanted toward the fixing groove 73 are formed in an end portion of the rear side of the fixing rib 31 and the coupling rib 71, the sunroof frame 3 is easily coupled to the fixing groove 73.

In an exemplary embodiment of the present invention, as described above, by coupling an end portion of the sunroof frame 3 to the fixing groove 73 between the fixing rib 31 and the coupling rib 71, the body 21 is fixed to the sunroof frame 3.

Therefore, in an exemplary embodiment of the present invention, by coupling the holder 10 to the sunroof frame 3 and the weather strip 7 through the above-described series of processes, the front surface of the body 21 supports the roof panel 1 and stably supports the weather strip 7 through the rear surface of the body 21.

In such a case, the front surface of the body 21 close contacts with the roof panel 1, and the front surface of the body 21 may be bonded to the roof panel 1 by adhesives or an adhesion tape.

Thereby, in an exemplary embodiment of the present invention, as described above, independent from the sunroof frame 3 and the weather strip 7, because the holder 10 is coupled to the sunroof frame 3 and the weather strip 7 through a configuration (e.g., the fixing rib 31, the first coupling unit 70, and the second coupling unit 80) for coupling the holder 10 and the weather strip 7, a separate additional element for coupling the holder 10 is unnecessary and an enhanced external appearance is provided.

In an exemplary embodiment of the present invention, because the holder 10 can be mounted with the above-described simple method, a mounting work of the holder 10 is easy, and the holder 10 can be easily detached.

In a state in which the body 21 is coupled to the sunroof frame 3 and the weather strip 7, the upper surface of the glass guide 51 of the holder 10 forms a soft external form from an exterior surface of the roof panel 1 and is exposed to the outside.

As described above, in a state in which the holder 10 is mounted, when the sunroof glass 5 is closed, in an exemplary embodiment of the present invention, while the front end portion of the sunroof glass 5 is guided to the glass guide 51, the front end portion is guided downward of the glass guide 51 and compresses the weather strip 7.

In a state in which the weather strip 7 seals between the front end portion of the sunroof glass 5 and the roof panel 1, the glass guide 51 binds the front end portion of the sunroof glass 5 at the upside. Therefore, when the vehicle travels in a high speed, the glass guide 51 prevents the sunroof glass 5 from lifting up by a pressure difference between indoors and outdoors of the vehicle.

Thereby, in an exemplary embodiment of the present invention, the sunroof glass lifting prevention device 100 may prevent the sunroof glass 5 from lifting up so that sealing performance of the weather strip 7 can be improved, and aspiration noise can be prevented from occurring when the vehicle travels in a high speed.

As described above, in the sunroof glass lifting prevention device 100 according to an exemplary embodiment of the present invention, an example of forming the holder 10 by injection molding a resin material has been described, but the present invention is not limited thereto and when the holder 10 is made of a rubber material, in order to reinforce rigidity of the holder 10, a core member of a metal material may be installed at the inside of the holder 10.

Further, in an exemplary embodiment of the present invention, an example of injection molding the holder 10 as a single piece and coupling the holder 10 to the sunroof frame 3 and the weather strip 7 is described, but the present invention is not limited thereto and the holder 10 of a resin, plastic, or rubber material may be integrally injection molded in the sunroof frame 3.

In an exemplary embodiment of the present invention, an example of attaching the holder 10 to the sunroof frame 3 using adhesives is described, but the present invention is not limited thereto and the holder 10 may be engage with the sunroof frame 3 through a fastening member such as a countersunk bolt.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sunroof glass lifting prevention device, comprising:
   at least one holder that is provided to corresponding to a front end portion of a sunroof glass and that supports the front end portion of the sunroof glass,
   wherein the at least one holder is disposed between a roof panel and the front end portion of the sunroof glass and is mounted to the sunroof frame,
   wherein the at least one holder includes:
      a body that is fixed to the sunroof frame and that supports a portion of a weather strip corresponding to the front end portion of the sunroof glass; and
      a glass guide that is integrally formed with the body and that covers and supports the front end portion of the sunroof glass at with the weather strip; and
   wherein a coupling hole that slidably receives a coupling protrusion that is formed in the weather strip is formed in the body.

2. The sunroof glass lifting prevention device of claim 1, wherein the at least one holder is made of one material that is selected from resin, plastic, and rubber materials having ductility.

3. The sunroof glass lifting prevention device of claim 1, wherein the at least one holder is formed in a "U" shape.

4. The sunroof glass lifting prevention device of claim 1, wherein the body includes a fixing rib that is extended in a lower part thereof and that is connected to the sunroof frame.

5. The sunroof glass lifting prevention device of claim 1, wherein the glass guide has an upper surface of a streamline shape.

6. The sunroof glass lifting prevention device of claim 5, wherein the body further includes a coupling rib that is integrally extended from the body and that is disposed at a predetermined gap with the fixing rib.

7. The sunroof glass lifting prevention device of claim 6, wherein a fixing groove that receives and fixes the sunroof frame is formed between the fixing rib and the coupling rib.

8. The sunroof glass lifting prevention device of claim 1, wherein the coupling hole includes a first hole that receives the coupling protrusion and a second hole that couples the coupling protrusion to the body.

9. The sunroof glass lifting prevention device of claim 8, wherein a guide rib that houses the coupling protrusion is formed in the body.

10. A sunroof assembly, comprising:
    a sunroof frame;
    a sunroof glass that is slidably mounted to the sunroof frame;
    a weather strip that is installed in the sunroof frame and that seals a roof panel and an edge of the sunroof glass; and
    a sunroof glass lifting prevention device including at least one holder that is provided to corresponding to a front end portion of the sunroof glass and that engages the front end portion of the sunroof glass to the roof panel;
    wherein a coupling protrusion is formed in the weather strip, and
    wherein a coupling hole that receives and couples the coupling protrusion is formed in the holder.

11. The sunroof assembly of claim 10, wherein the at least one holder includes:
    a body that is fixed to the sunroof frame and that supports a portion of the weather strip corresponding to the front end portion of the sunroof glass; and
    a glass guide that is integrally formed with the body and that covers and supports the front end portion of the sunroof glass with the weather strip.

12. The sunroof assembly of claim 11, wherein the body includes a fixing rib that is extended in a lower part thereof and that is connected to the sunroof frame.

13. The sunroof assembly of claim 12, wherein the sunroof glass lifting prevention device further includes a coupling rib that is integrally extended from the body and that is disposed at a predetermined gap from the fixing rib to couple the sunroof frame.

14. The sunroof assembly of claim 10, wherein the coupling hole includes a first hole that receives the coupling protrusion and a second hole that couples the coupling protrusion to the body.

15. The sunroof assembly of claim 14, wherein a guide rib that houses the coupling protrusion is formed in the body.

16. The sunroof assembly of claim 15,
    wherein the coupling protrusion is connected to the weather strip through a connection protrusion having a cross section smaller than a cross section of the coupling protrusion,
    wherein the connection protrusion is coupled to the guide rib, and
    wherein the coupling protrusion is housed at the guide rib.

* * * * *